United States Patent [19]

Blagdon et al.

[11] Patent Number: 5,496,571
[45] Date of Patent: Mar. 5, 1996

[54] METHOD FOR INCREASING THE PRODUCTION OF MILK IN RUMINANTS

[75] Inventors: Peter A. Blagdon; Robert D. Morgan, both of Paris, Ill.

[73] Assignee: Morgan Manufacturing Co., Inc., Paris, Ill.

[21] Appl. No.: 219,133

[22] Filed: Mar. 29, 1994

Related U.S. Application Data

[63] Continuation of Ser. No. 998,819, Dec. 30, 1992, abandoned.
[51] Int. Cl.$^6$ .................................................. A23K 1/00
[52] U.S. Cl. .................... 426/2; 426/99; 426/807
[58] Field of Search .................... 426/2, 98, 807, 426/601, 602, 96, 74, 99

[56] References Cited

U.S. PATENT DOCUMENTS 4,820,532  4/1989  Bayer et al. .............................. 426/74
5,204,029  4/1993  Morgan et al. .......................... 264/4.4

Primary Examiner—Anthony J. Weier
Attorney, Agent, or Firm—Keck, Mahin & Cate

[57] ABSTRACT

A method of increasing the production of milk in a ruminant in which a milk-production increasing amount of encapsulated choline is orally administered to a ruminant, with the choline encapsulated in an encapsulating composition that protects the choline against metabolism by bacteria in the rumen of the ruminant. An edible composition for increasing the production of milk in a ruminant in which a milk-production increasing effective amount of choline is encapsulated in an encapsulating composition that protects the choline against metabolism by bacteria in the rumen of the ruminant.

16 Claims, 1 Drawing Sheet

FIG. I
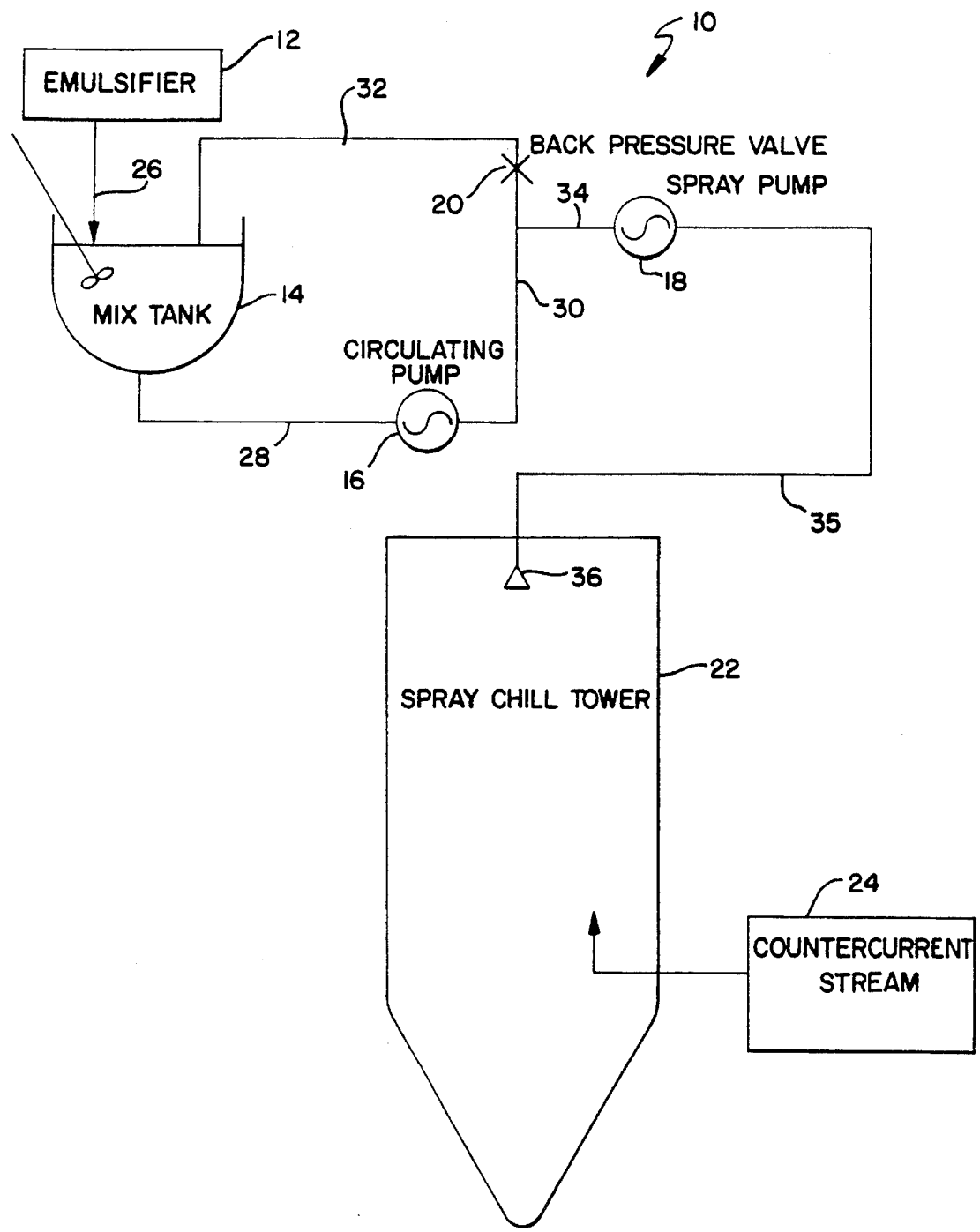

METHOD FOR INCREASING THE PRODUCTION OF MILK IN RUMINANTS

CROSS-REFERENCE TO RELATED APPLICATION

This application is a continuation of copending application Ser. No. 07/998,819, filed Dec. 30, 1992, now abandoned.

BACKGROUND OF THE INVENTION

1. Field of the Invention

The present invention relates to compositions and methods for increasing lactation in animals, and particularly to a composition and method for increasing the production of milk in ruminants.

2. Description of the Prior Art

Compositions and methods for increasing milk fat production in ruminants are generally known. For example, U.S. Pat. No. 4,857,332 discloses a composition for increasing milk production in ruminants, wherein the composition consists of (1) pellets containing predetermined amounts of sodium and/or magnesium antacids and potassium, sodium, and/or chlorine containing electrolytes, and (2) sodium bicarbonate.

Another technique for enhancing lactation in ruminants is described in U.S. Pat. No. 4,704,276, which discloses animal feed compositions comprising an edible feedstuff and a sufficient amount of an antibiotic selected from LL-E19020α and LL-E19020β.

Choline is a potential agent for increasing milk production in ruminants. Choline is not a vitamin, but rather is a micro-nutrient that affects nerve tissue and fat metabolism in animals. However, to date, choline has not been successfully employed as a milk production-enhancing agent, because choline compounds are metabolized by bacteria present in the rumen of ruminants before it can be absorbed and used by the animal.

It would therefore be desirable to provide an edible choline-containing product, and method of treatment, which would permit this agent to be used in controlled amounts to increase milk production in ruminants.

SUMMARY OF THE INVENTION

Applicants have discovered a method of increasing the production of milk in a ruminant by orally administering a milk-production increasing effective amount of encapsulated choline to the ruminant. A choline compound is encapsulated in an encapsulating composition that protects the choline compound against metabolism by bacteria in the rumen of the ruminant, thereby enabling controlled amounts of the choline to be readily absorbed in the digestive tract of the animal.

An edible composition for increasing the production of milk in a ruminant is also provided by the invention. The composition comprises a milk-production increasing effective amount of choline encapsulated in an encapsulating composition that protects the choline against metabolism by bacteria in the rumen of a ruminant upon oral administration of the composition to the ruminant. Preferred suitable encapsulating compositions for use in the products and methods of the invention are described in detail below.

The invention thus eliminates the problem of metabolization of choline in the rumen of ruminants, such that a substantial amount of choline orally administered to a ruminant can be absorbed by the animal through the animal's digestive tract, particularly the abomasum, stomach, and gut. As a result, the products and method of the invention produce a significant increase in the amount of milk produced by ruminants administered the inventive formulations.

BRIEF DESCRIPTION OF THE DRAWING

The drawing FIGURE is a schematic view of suitable apparatus for forming and spray cooling the choline containing microcapsules provided according to the invention.

DESCRIPTION OF THE PREFERRED EMBODIMENTS

In order to further define the invention, non-limiting preferred features of the invention will be described.

As described above, Applicants provide a method of increasing the production of milk in a ruminant, comprising: orally administering a milk-production increasing effective amount of encapsulated choline to a ruminant, wherein the choline is encapsulated in an encapsulating composition that protects the choline compound against metabolism by bacteria in the rumen of the ruminant.

Administration of the encapsulated choline composition may be conveniently achieved by admixing the choline containing microcapsules with the ruminant's normal feed ration. The encapsulated choline composition should be administered in amounts and at intervals effective to maintain the desired level of choline in the blood of the ruminant. Effective time intervals can be daily, every other day, weekly or at such other times depending on such factors as, for example, the weight of the ruminant and the level of choline in the ruminant's blood.

The method contemplated by the invention thus results in delivery of an effective dosage of choline to a ruminant in a delivery form that protects the choline against metabolism by rumen bacteria. Preferably, the choline is released in the abomasum, stomach, and gut of the ruminant, after the encapsulated composition passes through the rumen. Ruminants treated according to the inventive method exhibit notable increases in milk production, as illustrated by Example 5 below.

The edible composition for increasing the production of milk in a ruminant provided by the invention comprises: a milk-production increasing effective amount of choline encapsulated in an encapsulating composition that protects the choline against metabolism by bacteria in the rumen of a ruminant upon oral administration of the composition to the ruminant.

Choline is available in many forms such as choline chloride, choline bitartrate, choline dihydrogencitrate, choline bicarbonate, and choline free base. For purposes of the present invention, any of the above or other forms of choline that either are liquids immiscible in the encapsulating media or are readily soluble in a liquid immiscible in the encapsulating media are useful. Thus, as used herein, terms such as "choline", "choline compound" and "choline containing compound" together with analogous terms, encompass all of the foregoing.

For example, the chloride salt of choline suitable for use in the invention is readily available commercially as a syrupy liquid that is customarily sold as a 70% water solution. The encapsulated choline composition may contain suitable amounts of choline chloride to provide the desired increase in milk production. Also, the milk production effects can be varied depending on the total amount of the encapsulated choline composition administered to the animal.

Any suitable delivery form that permits choline to remain inert in the rumen but readily absorbed in the remainder of a ruminant's digestive tract is contemplated as being useful according to the invention. Preferably, the composition comprises microcapsules having a multiplicity of liquid choline-containing cores encapsulated in a solid shell material. For purposes of the invention, a "multiplicity" of cores is defined as three or more. The shell is formed of a material, such as an edible fat, that remains inert in the rumen but is readily absorbed in the remainder of a ruminant's digestive tract.

A preferred encapsulating composition for delivering the choline according to the present invention is described in Applicants' U.S. patent application Ser. No. 07/412,300, filed Sept. 25, 1989, issued on Apr. 20, 1993, as U.S. Pat. No. 5,204,029 the entire disclosure of which is incorporated herein by reference.

As described therein, microcapsules having a plurality of liquid cores can be prepared by forming a molten water-in-oil emulsion of the core and shell materials, and spray cooling the emulsion. The core and shell materials should be immiscible to maintain the integrity of the shell before the choline cores are intended to be released. The shell can generally comprise any material which can be melted, emulsified, and then solidified. The multi-core microcapsules have been found to be physically stronger than mono-core capsules, which is highly desirable because the microcapsules may be subjected to mechanical abrasion, as during shipping and handling, and are further subject to mechanical abrasion, such as by chewing by the ruminant, when administered. For example, if a mono-core capsule ruptures when administered, the liquid choline would be exposed to the action of rumen bacteria. The microcapsules of the invention preferably have a diameter between about 180 and about 1,000 microns, most preferably greater than about 400 microns.

A first category of useful fusible shell materials is that of normally solid fats, including fats which are already of suitable hardness and animal or vegetable fats and oils which are hydrogenated until their melting points are sufficiently high to serve the purposes of the present invention. Depending on the desired process and storage temperatures and the specific material selected, a particular fat can be either a normally solid or normally liquid material. The terms "normally solid" and "normally liquid" as used herein refer to the state of a material at desired temperatures for storing the resulting microcapsules. Since fats and hydrogenated oils do not, strictly speaking, have melting points, the term "melting point" is used herein to describe the minimum temperature at which the fusible material becomes sufficiently softened or liquid to be successfully emulsified and spray cooled, thus roughly corresponding to the maximum temperature at which the shell material has sufficient integrity to prevent release of the choline cores. "Melting point" is similarly defined herein for other materials which do not have a sharp melting point.

Specific examples of fats and oils useful herein (some of which require hardening) are as follows: animal oils and fats, such as beef tallow, mutton tallow, lamb tallow, lard or pork fat, fish oil, and sperm oil; vegetable oils, such as canola oil, cottonseed oil, peanut oil, corn oil, olive oil, soybean oil, sunflower oil, safflower oil, coconut oil, palm oil, linseed oil, tung oil, and castor oil; fatty acid monoglycerides and diglycerides; free fatty acids, such as stearic acid, palmitic acid, and oleic acid; and mixtures thereof. The above listing of oils and fats is not meant to be exhaustive, but only exemplary.

Another category of fusible materials useful as encapsulating shell materials is that of waxes. Representative waxes contemplated for use herein are as follows: animal waxes, such as beeswax, lanolin, shell wax, and Chinese insect wax; vegetable waxes, such as carnauba, candelilla, bayberry, and sugar cane; mineral waxes, such as paraffin, microcrystalline petroleum, ozocerite, ceresin, and montan; synthetic waxes, such as low molecular weight polyolefin (e.g., CARBOWAX), and polyol ether-esters (e.g., sorbitol); Fischer-Tropsch process synthetic waxes; and mixtures thereof. Water-soluble waxes, such as CARBOWAX and sorbitol, are not contemplated herein if the core is aqueous. Similarly, water soluble encapsulating materials are not contemplated by the present invention because the water normally present in the rumen would dissolve the encapsulating material and hence subject the choline compounds to bacterial degradation in the rumen.

Still other fusible compounds useful herein are fusible natural resins, such as rosin, balsam, shellac, and mixtures thereof. Mixtures of different types of the above materials, or materials not specifically recited above but having the desired property of making the choline compounds inert in the rumen, are also contemplated by the invention.

Various adjunct materials are contemplated for incorporation in fusible materials according to the present invention. For example, antioxidants, light stabilizers, dyes and lakes, flavors, essential oils, anti-caking agents, fillers, pH stabilizers, and the like can be incorporated in the fusible material in amounts which do not diminish its utility for the present invention.

The core material contemplated herein constitutes from about 1% to about 35% by weight of the microcapsules, preferably no more than about 30% by weight of the microcapsules, with a preferred minimum being about 5% by weight of the microcapsules. The choline core material is a liquid at the contemplated storage temperature of the microcapsules, and preferably has a boiling point which is greater than the processing temperature, thus eliminating the necessity to operate the process under sufficient pressure to elevate the boiling point of the core material. However, it will be understood that materials having a lower nominal boiling point than the process temperature can be used at an elevated pressure. Since in one embodiment of the invention the shell material has a melting point between 110° F. and 195° F., the preferred core materials will have boiling points exceeding 110° F. (43° C.), preferably exceeding 210° F. (99° C.), and exceeding the melting point of the particular contemplated shell material.

The liquid choline cores may include other additives well-known in the pharmaceutical art, including edible sugars, such as sucrose, glucose, maltose, fructose, lactose, cellobiose, and mixtures thereof; artificial sweeteners, such as aspartame, saccharin, cyclamate salts, and mixtures thereof; edible acids, such as acetic acid (vinegar), citric acid, ascorbic acid, tartaric acid, and mixtures thereof; edible starches, such as corn starch; hydrolyzed vegetable protein; water-soluble vitamins, such as Vitamin C; water-soluble medicaments; water-soluble nutritional materials, such as ferrous sulfate; flavors; salts; monosodium glutamate; antimicrobial agents, such as sorbic acid; antimycotic agents, such as potassium sorbate, sorbic acid, sodium benzoate, and benzoic acid; food grade pigments and dyes; and mixtures thereof. Other potentially useful supplemental core materials will be apparent to those of ordinary skill in the art.

Emulsifying agents may be employed to assist in the formation of stable emulsions. Representative emulsifying agents include glyceryl monostearate, polysorbate esters, ethoxylated mono- and diglycerides, and mixtures thereof.

The aqueous choline cores preferably have a pH of less than about 4 or a water activity, Aw, of about 0.7 or less (unless an antimicrobial compound is present). This low pH or water activity renders the microcapsules resistant to growth or reproduction of many types of microbes, thus retarding or preventing spoilage. However, mold or yeast growth can occur even if the water activity of the core is less than 0.7. Antimycotic agents are therefore contemplated for use herein even when the water activity of the core is less than 0.7.

For ease of processing, and particularly to enable the successful formation of a reasonably stable emulsion, the viscosities of the core material and the shell material should be similar at the temperature at which the emulsion is formed. In particular, the ratio of the viscosity of the shell to the viscosity of the core, expressed in centipoise or comparable units, and both measured at the temperature of the emulsion, should be from about 22:1 to about 1:1, desirably from about 8:1 to about 1:1, and preferably from about 3:1 to about 1:1. A ratio of 1:1 would be ideal, but a viscosity ratio within the recited ranges is useful.

To prepare the preferred encapsulated choline-containing product of the invention, the fusible solid shell and core materials are first provided. Next, the materials are emulsified under such conditions that the core is the discontinuous (inner) phase and the shell is the continuous (outer) phase. At the time the emulsion is formed, it is preferred to heat the component materials sufficiently such that the temperatures of both phases exceed the melting point of the shell material. The heated emulsion is then spray cooled to a final temperature lower than the melting point of the shell material. The microcapsules formed during the spray cooling process are globules in which the continuous outer phase is a solid shell which encapsulates an inner discontinuous phase containing a multiplicity of liquid choline chloride cores. If desired, the shell can be further cooled by immersing the microcapsules in a cooling liquid or gas.

A preferred process for preparing choline chloride microcapsules for use according to the invention will now be described. Referring to the drawing figure, the apparatus generally indicated at 10 includes an emulsifier 12, a mix tank 14, pumps 16 and 18, a back pressure valve 20, a spray chill tower 22, a source 24 of a stream of cooling gas, and conduits 26, 28, 30, 32, 34, and 35. Emulsifier 12 is a high shear mixer of the type commonly used to prepare emulsions. While FIG. 1 shows the source 24 of the stream of cooling gas to be flowed in countercurrent direction, it will be understood that the flow of the cooling gas can also be co-current or cross-current.

The core and shell materials, each preferably in fluid form, are supplied to emulsifier 12, where they are emulsified to form a water-in-oil type of emulsion. The product of emulsifier 12 is supplied by a conduit or other means 26 to a mix tank 14 which is stirred to maintain the emulsion before it is spray cooled. Mix tank 14 may be supplied with a recycle loop consisting of conduit 28, pump 16, back pressure valve 20 (which maintains a head of pressure in the recycle line), and conduit 32. Circulating pump 16 provides a sufficient flow rate to keep the material in the recycle loop in turbulent flow continuously, thereby maintaining the emulsion intact. Conduit 30 is tapped by conduit 34 to supply the emulsion to spray pump 18.

The effluent of pump 18 travels via conduit 35 to a nozzle 36, which can be a single or multiple nozzle. The emulsion is sprayed into chill tower 22. Immediately after leaving nozzle 36, the emulsion is subdivided into droplets in which the continuous layer, comprised of a fusible material, envelops droplets of the liquid choline chloride core material. By regulating the proportions of the ingredients and the size of the droplets sprayed from nozzle 36 versus the size of the discontinuous phase, multiple droplets of liquid choline chloride can be enveloped within a single microcapsule.

While in the chill tower, the originally liquid shell is cooled sufficiently to harden into a form-retaining condition. Ideally, the shell is hardened sufficiently by the current of cooling air or other gas to form a free-flowing powder when collected with other microcapsules as a bulk powder.

The relative sizes of the cores and shell can be varied according to the process conditions. The size of each core is determined by the emulsification conditions, which determine the size of the discontinuous phase droplets. The size of each shell is determined by the spraying conditions in chill tower 22 and the proportions of the oil phase and water phase. If the microcapsules are sticky, due to the fusible material being fairly soft or small amounts of discontinuous phase being deposited on the shell surfaces, a free-flowing product can be obtained by incorporating from about 0.01% to about 20% by weight of an anti-caking agent in the microcapsules. Exemplary anti-caking agents include calcium silicate, tricalcium phosphate, calcium carbonate, and mixtures thereof.

The following examples illustrate how to practice the invention. Examples 1 and 2 illustrate general techniques for preparing suitable encapsulating compositions for use according to the invention. Example 3 illustrates the preparation of a preferred inventive composition including choline chloride. Example 4 illustrates the stability and inertness of the product of the invention when introduced into the rumen of a ruminant. Example 5 demonstrates the effectiveness of the method and product of the invention in increasing milk production in ruminants. All percentages given in the examples are by weight unless otherwise indicated.

EXAMPLE 1

Preparation of Encapsulated Composition

Two thousand pounds of deodorized hydrogenated beef tallow (iodine value around 10, melting point 140° F. or 60° C.) was heated to 180° F. (82° C.) in a jacketed tank. The molten material was agitated with a LIGHTIN' mixer sold by Mixing Equipment Co., Inc., Rochester, N.Y. (model no. NC-42 VS). To the melt, 500 pounds (226 kg) of high fructose corn syrup (80% solids) and 7½ pounds (3.4 kg) of flavor were added. When dispersion was complete, the circulating pump was started and circulation established. A portion of the circulating material was diverted to the spray pump, which forced the dispersion to the top of the spray tower (pressure at pump: 400–500 psig or 275–345 N/cm$^2$) where it passed through a pressure atomizing nozzle into the tower. The tower was held at about 65° F. (18° C.). This temperature can be maintained by the use of cryogenic gas, ambient air (in cool weather) or refrigerated air.

The particles falling from the tower were slightly tacky. They were placed in a rotary mixer and 0.25% powdered calcium silicate was added. The final mix was a uniform, free-flowing powder with a particle diameter of around 425 microns (U.S. Sieve Series #40 mesh).

The resulting product can be used as a highly palatable fat additive in feeds for ruminant and monogastric animals.

EXAMPLE 2

Preparation of Encapsulated Composition

Twenty-one pounds (9.5 kg) of partially hydrogenated cottonseed oil (m.p. 146° F., 63° C.) were melted and heated to 185° F. (85° C.). In a separate container 2 pounds (0.9 kg) of water were heated and 5 pounds (2.3 kg) of FIDCO 4 BE hydrolyzed vegetable protein were dissolved in the water. The solution was heated to 185° F. (85° C.) and mixed into the melted fat with vigorous agitation.

The mixture was poured into a holding chamber feeding a high pressure pump. Mechanical agitation was carried on in the holding chamber during spraying.

The mixture was atomized into a 60° F. (16° C.) chamber and collected. It formed a free-flowing powder with a "beefy" odor.

One hundred grams of flour and 27 grams of the sprayed material were mixed with 400 grams of water and heated to boiling, forming a gravy with a typical "beefy" taste.

EXAMPLE 3

Preparation of Encapsulated Choline Chloride Composition

Seventy pounds of hydrogenated beef tallow (iodine value 2–15, m.p. 125°–145° F.) was placed in a steam jacketed tank equipped with an agitator. The fat was heated to 175° F., the agitator turned on, and 30 pounds of 70% choline chloride solution added and mixed in thoroughly. Mixing was continued, and the mixture atomized into a tower continuously cooled with $CO_2$ gas. The resulting choline chloride microcapsules were collected, sieved, and stored for future use.

EXAMPLE 4

Stability of the Encapsulated Composition in the Rumen

A study was conducted to determine the stability in the rumen of the preferred encapsulating composition.

Encapsulated feed compositions commercially available as "Dairy 80" (Morgan Mfg. Co., assignee of the present invention) were placed in dacron bags (approx. 5 cm×20 cm) and suspended in the rumens of two fistulated animals, one dry cow and one steer. A time series was employed with rumen residence times of 0, 4, 8, 12, 24, and 48 hours. Two bags, each initially containing 10 grams of microcapsules, were removed at each time period (a total of 12 bags were removed from each animal). Upon removal from the rumen, each bag was washed in cold running water until the effluent was clear. Bag contents were then dried, weighed, and extracted with non-polar solvent in a standard reflux apparatus for lipid determination (gravimetric).

Both animals were adapted to a total mixed ration containing corn silage, hay crop silage, high moisture corn, and concentrate materials for 21 days prior to the 48-hour test. Daily observations were made of the health status of each animal to insure normal rumen conditions during the 48-hour test period. The results of the study are summarized in Tables 1–5 below.

TABLE 1

Dry Matter Recovered From the Rumen Over a 48-Hour Period

| Animal | Time in Rumen | DM in (g) | DM out (g) | % Recovered |
|---|---|---|---|---|
| Steer | 0 | 9.7521 | 9.5837 | 98.27% |
|  | 0 | 9.7463 | 9.5161 | 97.63% |
|  | 4 | 9.7521 | 9.1577 | 93.84% |
|  | 4 | 9.7480 | 9.1647 | 94.01% |
|  | 8 | 9.7498 | 9.2162 | 94.52% |
|  | 8 | 9.7521 | 9.2069 | 94.40% |
|  | 12 | 9.7457 | 9.1275 | 93.65% |
|  | 12 | 9.7494 | 9.5388 | 97.83% |
|  | 24 | 9.7541 | 9.0293 | 92.564 |
|  | 24 | 9.7519 | 8.9028 | 91.29% |
|  | 48 | 9.7470 | 8.8238 | 90.524 |
|  | 48 | 9.7526 | 8.9845 | 92.12% |
| Cow | 0 | 9.7452 | 9.5533 | 98.03% |
|  | 0 | 9.7506 | 9.5950 | 98.40% |
|  | 4 | 9.7538 | 9.1422 | 93.72% |
|  | 4 | 9.7543 | 9.1841 | 94.15% |
|  | 8 | 9.7462 | 9.2563 | 94.97% |
|  | 8 | 9.7482 | 9.0303 | 92.63% |
|  | 12 | 9.7500 | 9.0981 | 93.31% |
|  | 12 | 9.7463 | 9.0585 | 92.94% |
|  | 24 | 9.7515 | 8.8505 | 90.76% |
|  | 24 | 9.7477 | 8.9516 | 91.83% |
|  | 48 | 9.7466 | 8.9494 | 91.82% |
|  | 48 | 9.7489 | 8.9618 | 91.92% |

"DM in" refers to dry matter introduced into the rumen.
"DM out" refers to dry matter recovered from the rumen.

TABLE 2

Percent Recovery of Fat From the Rumen Over a 48-Hour Period

| Time (hrs.) | Cow | Steer | Average |
|---|---|---|---|
| 0 | 98.1% | 98.3% | 98.2% |
| 4 | 98.6% | 98.3% | 98.5% |
| 8 | 96.4% | 98.1% | 97.3% |
| 12 | 97.4% | 99.9% | 98.6% |
| 24 | 96.0% | 94.4% | 95.2% |
| 48 | 86.6% | 80.5% | 83.5% |

$$\text{Percent recovery} = \frac{\text{Calculated fat recovery}}{\text{Fat \% analysis of Dairy 80 (from Table 3)}}$$

TABLE 3

Goldfisch Fat Analysis of Dairy 80

| Sample No. | Sample DM (g) | Extracted Fat (g) | % Fat |
|---|---|---|---|
| 1 | 1.9964 | 1.7921 | 89.77% |
| 2 | 1.9880 | 1.7937 | 90.23% |
| 3 | 1.9759 | 1.8240 | 92.31% |
| 4 | 2.0270 | 1.8322 | 90.39% |
| 5 | 1.9786 | 1.7974 | 90.84% |

TABLE 4

Goldfisch Extraction of Recovered Dry Matter

| Animal | Time | Sample dry wt. (g) | Fat Extracted | % Fat |
|---|---|---|---|---|
| Steer | 0 | 2.0405 | 1.8900 | 92.62% |
|  | 0 | 2.0053 | 1.8400 | 91.76% |
|  | 4 | 2.0638 | 1.9826 | 96.07% |

TABLE 4-continued

Goldfisch Extraction of Recovered Dry Matter

| Animal | Time | Sample dry wt. (g) | Fat Extracted | % Fat |
|---|---|---|---|---|
| | 4 | 2.0654 | 1.9902 | 96.36% |
| | 8 | 2.0096 | 1.9353 | 96.204 |
| | 8 | 2.0198 | 1.9077 | 94.45% |
| | 12 | 2.1849 | 2.0965 | 95.95% |
| | 12 | 2.1949 | lost | |
| | 24 | 2.0686 | 1.9488 | 94.21% |
| | 24 | 2.0399 | lost | |
| | 48 | 2.0096 | 1.8126 | 84.51% |
| | 48 | 2.0470 | 1.5903 | 77.69% |
| Cow | 0 | 2.0034 | 1.8472 | 92.20% |
| | 0 | 2.0436 | 1.8679 | 91.40% |
| | 4 | 1.9814 | 1.9180 | 96.80% |
| | 4 | 1.9598 | 1.8858 | 96.22% |
| | 8 | 2.0219 | 1.9335 | 95.63% |
| | 8 | 2.0095 | 1.8697 | 93.04% |
| | 12 | 2.0033 | 1.9415 | 96.92% |
| | 12 | 2.0350 | 1.9595 | 96.29% |
| | 24 | 2.0143 | 1.9330 | 95.96% |
| | 24 | 2.0311 | 1.9720 | 97.09% |
| | 48 | 2.0399 | 1.8201 | 89.22% |
| | 48 | 2.0025 | 1.6859 | 84.19% |

TABLE 5

Dry Matter Recovery, Fat Recovered as a Percent of Recovered Dry Matter, and Calculated Fat Recovery From the Rumen

| Animal | Time (hrs.) | % DM Recovered | Fat recovered as Percent of Recovered | DM avg. | Calculated Fat Recovery as % of Original Encapsulated Composition |
|---|---|---|---|---|---|
| Steer | 0 | 98.27% | 92.6% | | |
| | 0 | 97.63% | 91.8% | 92.2% | 90.3% |
| | 4 | 93.84% | 96.1% | | |
| | 4 | 94.01% | 96.4% | 96.2% | 90.3% |
| | 8 | 94.52% | 96.2% | | |
| | 8 | 94.40% | 94.5% | 95.3% | 90.1% |
| | 12 | 93.65% | 95.9% | | |
| | 12 | 97.83% | lost | 95.9% | 91.8% |
| | 24 | 92.56% | 94.2% | | |
| | 24 | 91.29% | lost | 94.2% | 86.7% |
| | 48 | 90.52% | 84.5% | | |
| | 48 | 92.12% | 77.7% | 81.1% | 74.0% |
| Cow | 0 | 98.03% | 98.0% | | |
| | 0 | 98.40% | 98.4% | 98.2% | 90.1% |
| | 4 | 93.72% | 93.7% | | |
| | 4 | 94.15% | 94.2% | 93.9% | 90.6% |
| | 8 | 94.97% | 95.0% | | |
| | 8 | 92.63% | 92.6% | 93.8% | 88.6% |
| | 12 | 93.31% | 92.3% | | |
| | 12 | 92.94% | 92.4% | 92.4% | 89.5% |
| | 24 | 90.76% | 90.8% | | |
| | 24 | 91.83% | 91.8% | 91.3% | 88.2% |
| | 48 | 91.82% | 91.8% | | |
| | 48 | 91.92% | 91.9% | 91.8% | 79.6% |

Calculated fat recovery as percent of original Dairy 80 introduced = avg. dry matter recovery × fat recovered as percent of recovered dry matter.

The results of the study indicate that the Dairy 80 microcapsules were stable in the rumen environment for the first 12 hours, which is the normal rumen residence time. There appeared to be no appreciable degradation of the microcapsules over 24 hours (twice the normal rumen residence time). At 48 hours there was a small but measurable ($p<0.05$) disappearance of the microcapsules. The small loss at 48 hours may have been caused by microbial breakdown of the microcapsules or physical abrasion.

The data in Table 4 showing extraction of dry matter recovered from the dacron bags indicate a higher fat percentage (for the 4, 8, 12, and 24-hour rumen residence times) than in the initial product. This could be due to the digestion of surface carbohydrate, increasing the effective fat percentage.

All the data indicate a high level of rumen stability for a potentially digestible, biologically available material.

EXAMPLE 5

Administration of Encapsulated Choline Chloride to Ruminants

A dairy herd (300 cows), with an average milk production over seven months of 73 lbs./cow/day, was supplemented with 4 ounces (per cow, per day) of encapsulated choline chloride prepared according to the present invention. This corresponded to a dosage level of about 22 grams of choline chloride per cow per day. The choline chloride microcapsules were admixed with the herd's normal ration. No other change in diet was made. During the next six months, milk production of the herd was monitored. The results of the study are summarized in Tables 6 and 7 below.

TABLE 6

Data Summary (Average)

| | Control Period | Test Period |
|---|---|---|
| RHA Milk | 23,976 lbs. | 24,672 lbs. |
| RHA Fat | 892 lbs. | 923.8 lbs. |
| RHA Protein | 750 lbs. | 760 lbs |
| Milk Production | 73 lbs./head/day | 80.7 lbs./head/day |

TABLE 7

| | | | | | | | | | | | | | | | |
|---|---|---|---|---|---|---|---|---|---|---|---|---|---|---|---|
| | | | | | | | MILK PRODUCTION AVERAGES | | | | | | | | |
| No. | Date of Test | RHA Milk (lbs) | RHA Fat (lbs) | RHA Pro (lbs) | Avg DIM | Avg Milk all | Avg Milk prod | Avg 150 d Milk | Avg Fat % | Avg Pro % | Avg SCC 1 g | WeS SCC 1 g | RHA Pea 1st | RRA Pea 2nd | RHA Pea 3rd |
| 1 | 920928 | 25206 | 957 | 783 | 193 | 69.3 | 75.8 | 86.6 | 3.8 | 3.3 | 2.1 | 2.5 | 88 | 111 | 112 |
| 2 | 920830 | 25031 | 944 | 773 | 185 | 71.6 | 74.7 | 80.5 | 3.8 | 3.2 | 1.7 | 2.5 | 88 | 111 | 114 |
| 3 | 920803 | 24877 | 931 | 765 | 171 | 76.7 | 81.9 | 84.2 | 3.8 | 3.0 | 1.9 | 3.2 | 88 | 111 | 114 |
| 4 | 920629 | 24495 | 910 | 750 | 141 | 78.4 | 85.2 | 83.8 | 3.6 | 3.1 | 1.6 | 3.1 | 84 | 110 | 112 |
| 5 | 920601 | 24276 | 902 | 745 | 144 | 74.8 | 84.8 | 86.2 | 3.8 | 3.1 | 3.2 | 4.1 | 85 | 106 | 114 |
| 6 | 920429 | 24147 | 899 | 744 | 146 | 76.4 | 81.8 | 84.4 | 3.7 | 3.1 | 2.2 | 4.7 | 85 | 105 | 113 |
| 7 | 920401 | 24113 | 896 | 744 | 176 | 64.6 | 78.8 | 80.5 | 3.9 | 3.1 | 2.5 | 3.8 | 81 | 103 | 113 |
| 8 | 920303 | 24047 | 854 | 747 | 166 | 70.4 | 77.9 | 78.1 | 3.7 | 2.8 | 2.9 | 3.8 | 78 | 104 | 108 |
| 9 | 920204 | 23863 | 892 | 750 | 169 | 68.6 | 73.8 | 80.5 | 3.7 | 3.0 | 2.2 | 2.8 | 76 | 103 | 107 |
| 10 | 920104 | 23910 | 891 | 754 | 184 | 63.6 | 73.9 | 79.5 | 4.3 | 3.4 | 2.3 | 2.5 | 75 | 103 | 108 |
| 11 | 911125 | 24061 | 890 | 754 | 198 | 59.1 | 66.8 | 73.7 | 3.8 | 3.1 | 1.8 | 2.1 | 74 | 102 | 109 |
| 12 | 911029 | 23940 | 889 | 751 | 185 | 63.9 | 70.4 | 76.7 | 3.4 | 3.1 | 5.3 | 5.5 | 75 | 102 | 111 |
| 13 | 910930 | 23888 | 892 | 750 | 186 | 61.7 | 69.4 | 74.8 | 3.4 | 3.1 | 3.7 | 3.9 | 73 | 102 | 111 |

TABLE 7

| Column Heading | MEANING |
|---|---|
| Date of Test | Date that measurements were taken. E.g., 920928 = September 28, 1992. |
| RHA Milk | Rolling Herd Average of milk production, in lbs. |
| RHA Fat | Rolling Herd Average of fat in milk, in lbs. of RHA milk production. |
| RHA Pro | Rolling Herd Average of protein in milk, in lbs. of RHA milk production. |
| Avg DIM | Average days of milk for herd. |
| Avg Milk all | Average milk production in lbs. per cow, including dry cows. |
| Avg. Milk prod | Average milk production in lbs. per cow, excluding dry cows. |
| Avg 150 d milk | Average milk production in lbs. per cow measured at 150 days into lactation period. |
| Avg Fat % | Average % fat in milk calculated by, e.g., 957 ÷ 25206 × 100 for first row of data. |
| Avg Pro % | Average of protein in milk calculated by, e.g., 783 ÷ 25206 × 100 for first row of data. |
| Avg SCC 1 g | Average somatic cell count per 1 gram. |
| WeS SCC 1 g | Wisconsin estimated somatic cell count |
| RHA Pea 1st | Rolling Herd Average of peak pounds of milk produced during 1 month rolling period of those cows in first breeding period. |
| RHA Pea 2nd | Rolling Herd Average of peak pounds of milk produced during 1 month rolling period of those cows in second breeding period. |
| RHA Pea 3rd | Rolling Herd Average of peak pounds of milk produced during 1 month rolling period of those cows in third breeding period. |

The period during which the test of the micro-encapsulated choline chloride was administered to the herd is found in row numbers 1 through 6; row numbers 7–13 of Table 7 represent the base-line pretest data. The average milk production for the test period was found to be 80.7 lbs. per cow, excluding dry cows (i.e., average of rows 1–6 in column headed "Avg Milk prod"). The average for the base-line period, excluding dry cows, was 73.0 lbs/cow. Thus, milk production increased on average 7.7 lbs/cow. Also, there was no measured change in the butterfat level or average protein level of the milk, which indicates that the increased milk production was real and not caused by a dilution.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method of increasing the production of milk in a ruminant, comprising:

orally administering to a ruminant a milk-production increasing effective amount of a liquid choline-containing composition, said composition comprising microcapsules substantially each of said microcapsules having an edible, substantially continuous, solid, fusible outer shell encapsulating a discontinuous phase, said discontinuous phase including a multiplicity of choline-containing liquid cores, wherein said outer shell protects said choline-containing liquid cores in said discontinuous phase against metabolism by bacteria in the rumen of the ruminant wherein said shell material is made of a material which remains inert in the rumen.

2. The method of claim 1, wherein the choline in said cores is absorbed by the ruminant in at least the abomasum of the ruminant.

3. The method of claim 1, wherein the choline in said liquid cores is absorbed by the ruminant in at least the gut of the ruminant.

4. The method of claim 1, wherein the choline in said liquid cores is absorbed by the ruminant in the abomasum and gut of the ruminant.

5. The method of claim 1, wherein the shell is selected from the group consisting of animal fat, hydrogenated animal fat, hydrogenated vegetable oil, and mixtures thereof.

6. The method of claim 1, wherein said choline-containing liquid cores comprise an aqueous solution of choline chloride, choline bitartrate, choline dihydrogencitrate, choline bicarbonate, choline free base and mixtures thereof.

7. An edible composition for increasing the production of milk in a ruminant, comprising:

a milk-production increasing effective amount of a liquid choline-containing composition, said composition comprising microcapsules substantially each of said microcapsules having an edible, substantially continuous, solid, fusible outer shell encapsulating a discontinuous phase, said discontinuous phase including a multiplicity of choline-containing liquid cores, wherein said outer shell protects said choline-containing liquid cores in said discontinuous phase against metabolism by bacteria in the rumen of the ruminant wherein said shell material is made of a material which remains inert in the rumen.

8. The composition of claim 7, wherein the shell is selected from the group consisting of animal fat, hydrogenated animal fat, hydrogenated vegetable oil, and mixtures thereof.

9. The composition of claim 7, wherein the cores have a boiling point at atmospheric pressure which is greater than the melting point of the shell.

10. The composition of claim 7, wherein the shell has a melting point between about 110° F. and about 195° F.

11. The composition of claim 7, wherein the cores have a boiling point of greater than about 210° F.

12. The composition of claim 7, wherein the ratio of the viscosity of the shell to the viscosity of the cores, expressed in centipoise and measured at the temperature of the emulsion, is from about 22 to 1 to about 1 to 1.

13. The composition of claim 7, comprising from about 1% to about 35% by weight of the cores and from about 65% to about 99% by weight of the shell.

14. The composition of claim 7, comprising from about 5% to about 30% by weight of the cores and from about 70% to about 95% by weight of the shell.

15. The composition of claim 7, wherein the microcapsules have an average diameter of between about 180 microns and about 1000 microns.

16. The composition of claim 7, wherein said choline-containing liquid cores comprises an aqueous solution of choline chloride, choline bitartrate, choline dihydrogencitrate, choline bicarbonate, choline free base and mixtures thereof.

* * * * *